United States Patent
Kaminsky et al.

(10) Patent No.: US 6,813,094 B2
(45) Date of Patent: Nov. 2, 2004

(54) SURFACE FORMED COMPLEX POLYMER LENSES DIFFUSE REFLECTOR

(75) Inventors: Cheryl J. Kaminsky, Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/095,172

(22) Filed: Mar. 11, 2002

(65) Prior Publication Data

US 2003/0169513 A1 Sep. 11, 2003

(51) Int. Cl.⁷ .............................................. G02B 13/20
(52) U.S. Cl. ..................... 359/707; 359/727; 359/731; 349/112; 349/113; 428/1.1
(58) Field of Search .................................. 359/707, 726, 359/727, 730, 731, 733; 349/112, 113; 428/1.1

(56) References Cited

U.S. PATENT DOCUMENTS

| | | | |
|---|---|---|---|
| 4,456,336 A | * | 6/1984 | Chung et al. ............... 349/160 |
| 6,262,214 B1 | * | 7/2001 | Yanagase et al. ........ 526/329.6 |
| 6,266,476 B1 | | 7/2001 | Shie et al. |
| 6,270,697 B1 | | 8/2001 | Myers et al. |
| 6,421,103 B2 | * | 7/2002 | Yamaguchi .................. 349/61 |

* cited by examiner

Primary Examiner—Scott J. Sugarman
Assistant Examiner—Darryl J. Collins
(74) Attorney, Agent, or Firm—Arthur E. Kluegel (57) ABSTRACT

Disclosed is a diffuse reflector comprising a reflective layer and a transparent polymeric film comprising a plurality of complex lenses on a surface thereof.

49 Claims, 3 Drawing Sheets

SURFACE FORMED COMPLEX POLYMER LENSES DIFFUSE REFLECTOR

CROSS REFERENCE TO RELATED APPLICATIONS

This application is one of a group of seven applications co-filed under Ser. Nos. 10/095,204, 10/095,601, 10/095,145, 10/095,172, 10/095,319, 10/094,977 and 10/094,979.

FIELD OF THE INVENTION

The invention relates to a diffuse reflector for specular light. In a preferred form, the invention relates to a back reflector for transmission, transflection, and reflection type rear projection liquid crystal display devices.

BACKGROUND OF THE INVENTION

Reflectors are often used in optical displays, such as liquid crystal displays, to even out illumination across the display and to diffusely reflect the light from the backlight or light coming in the display from the environment. Prior art reflectors include planar specular reflectors and planar diffusive reflectors. Specular reflectors include a substantially planar surface that is covered with a reflective metallic coating. Specular reflectors are characterized by an angle of incidence being substantially equal to an angle of reflection. Diffusive reflectors typically have a roughened surface which is predominately coated with a metallic reflective coating. Diffusive reflectors are characterized by reflecting and scattering incident light.

The transmission-type LCD includes a backlight, typically one to two cold fluorescent bulbs at the back surface of the liquid-crystal panel. The backlight consumes a relatively large amount of power. The diffuse reflector evens out the illumination of the back light across the entire display to eliminate any hot (brighter) spots. The more efficient a reflector is at diffusing, the more even the light will be across the display. The more efficient the reflector is, minimizing the amount of light lost to transmission and absorption, the more light passes through the liquid crystal and is realized as a brighter screen. This more efficient diffuse reflector can be used for a brighter display or for less power use that extends battery life Reflection-type LCDs include a reflector for reflecting light at a back surface of the LCD, in which ambient light is reflected on the reflector to display images. The diffuse reflector reflects and diffuses the ambient light to mask any hot spots due to differences in ambient lighting across the display. The more efficient the reflection and diffusion of the reflector is, the brighter the display can be. This display does not use a backlight reducing the amount of required power but the ambient light reflection cannot produce satisfactory brightness for vivid color images and is used on calculator and other text displays.

A transflection display is a combination of a transmission display and a reflection display. A cell phone and PDA are examples of this type of device. They work in both reflection and transmission mode using ambient light and a backlight alternatively. The diffuse reflector in this application reflects and diffuses the backlight and the ambient light to give a bright, even display in both modes. A transflector increases efficiency and brightness under both ambient and supplemental lighting conditions in visual display applications. In an attempt to overcome the above described drawbacks of reflective and transmissive displays, some electronic displays have been designed to use ambient light when available and backlighting only when necessary. This dual function of reflection and transmission leads to the designation, "transflective". One problem with currently available transflective displays is that they have good performance in either reflective or transmissive mode, but not both. This stems from the fact that the backlight assembly is not as efficient a reflector as the back reflector traditionally used in a purely reflective display, and the display thus appears less bright when viewed under ambient light. In addition, many devices with small display screens, such as pagers, use reflective LCDs with a supplemental electroluminescent backlight for low ambient light conditions. The LCD is backed with a plastic film that is partially reflective and partially transmitting. A transflective display can be made by placing a transflective film between the rear polarizer and the backlight. The transflective film provides a specified trade-off between reflectivity for ambient lighting and transmission for backlit operation. Diffuse reflectors for light have been manufactured in a number of ways. Generally, diffuse reflectors are made by taking a reflective surface and roughening one of its faces. One method of manufacture involves sprinkling powders on a flat surface and gluing the powders to the surface. A second method involves grinding or blasting a metal or glass surface to achieve the necessary roughness for diffusely reflecting infrared wavelengths. A third method is to dimple an aluminum surface with a regular hexagonal array of approximately $\frac{1}{64}$-inch diameter holes.

The primary disadvantages of the above methods of roughening a reflective surface is that they either do not make the surface rough enough or they do not make the roughness random enough to enable the surface to function as an isotropic diffuse reflector. If the surface is not rough enough the reflectance will not be perfectly diffuse and it will have an enhancement or peak in the specular direction that gets longer at longer wavelengths. If the roughness is non-random, the non-randomness will create diffraction effects that favor particular off-specular directions of reflection, thus making the diffuse reflectance non-isotropic. Other general methods for roughening a surface include electric discharge machining (EDM). U.S. Pat. No. 3,754, 873 (Bills et al.) discloses a cold rolled sheet having a roughened surface formed by projections of such shape and arrangement that the visual appearance of the surface of the sheet is relatively constant. EDM is cost and time prohibitive to make diffuse reflectors on a large scale.

Other diffuse reflectors used as reflectors in displays use a voided polymer structure with titanium dioxide. This provides for a high amount of diffusion, but does not have the high amount of reflectivity leading to a darker display.

U.S. Pat. No. 5,976,686 (Kaytor et al.) relates to a diffuse reflector made of porous polymeric sheets using thermally induced phase sepreatoin technology (TIPS). The TIPS diffuse reflector can not deliver as high a reflectivity as a metallized surface. To achieve the same brightness of a backlit display with a metallized surface, a display with a TIPS diffuse reflector would have to increase the brightness of the backlight, reducing the lifetime of the battery. The light scattering regions of the TIPS diffuse reflector are on the order of the wavelength of light and could add color to the light diffused thus imparting a non-desirable coloration to the display.

U.S. Pat. No. 5,917,567 (Oh at al.) relates to a reflector having diffusion characteristics in which the surface of the reflector is formed with a plurality of convex portions by uniformly depositing fine spacers. The reflector is manufactured by providing a substrate, forming a thin layer of a solution of beads and polymer on the substrate, and forming a reflective layer on the thin layer. The beads form simple reflective lenses as compared to the complex lenses used in this invention. Complex lenses provide more efficient diffusion because of the multitude of lens surfaces and thus provide more efficient diffusion than can be obtained with a simple lens diffuse reflector.

U.S. Pat. No. 6,261,994 (Bourdelais et al.) describes a reflective photographic base materials made up of layers of biaxially oriented polyolefin sheet with voiding, $TiO_2$ and colorants adjusted to provide optimum reflection properties. Voided films with $TiO_2$ typically have diffuse reflectances of 85–90% at 500 nm making them inferior to the complex lenses diffuse reflectors that have more efficient diffuse reflectances. Also, voided films tend to be thicker and therefore add weight to the display device.

U.S. Pat. No. 6,018,379 (Mizobata) describes a conventional reflective liquid crystal display that has been configured to form a convex-concave at the reflecting surface of the reflector. To form the concave-convex surface, it is necessary to deposit an insulating film and to pattern the deposited insulating film to form the convex-concave surface. The fine control of a shape such as an inclined angle of the convex-concave is difficult, with the result that a sufficient light scattering cannot be obtained. Abrading or grinding the surface with abrasive powder and further etching it with a hydrofluoric acid if necessary can also form the convex-concave surface. A light scattering coating can be formed by spin-coating. These methods described are labor and time intensive, use hazardous materials, and must be made in a sheet as instead of rolls making them prohibitively expensive.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

The U.S. Pat. No. 6,285,001 (Fleming et al) relates to an exposure process using excimer laser ablation of substrates to improve the uniformity of repeating microstructures on an ablated substrate or to create three-dimesional microstructures on an ablated substrate. This method is difficult to apply to create a master chill roll to manufacture complex random three-dimesional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

PROBLEM TO BE SOLVED BY THE INVENTION

There remains a need for an improved reflected light diffusion of image illumination light sources to provide improved diffuse light reflection while simultaneously maximizing the amount of light reflected.

SUMMARY OF THE INVENTION

The invention provides a diffuse reflector comprising a reflective layer and a transparent polymeric film comprising a plurality of complex lenses on a surface thereof. The invention also provides a diffuse light, a back lighted imaging media, a liquid crystal display component and device, and a method of making the reflector.

ADVANTAGEOUS EFFECT OF THE INVENTION

The invention provides improved light reflection while simultaneously diffusely reflecting specular light sources.

DETAILED DESCRIPTION OF THE INVENTION

The invention has numerous advantages over prior practices in the art. The invention provides diffuse reflection of light sources such as those that are commonly used in rear projection display devices such as liquid crystal display devices. Further, the invention, while providing diffusion to the light sources, has a high light reflectivity rate. A high reflectivity rate for diffuse reflectors is particularly important for liquid crystal display devices. High reflectivity values allow the liquid crystal display to be brighter or holding the level of brightness the same, allows for the power consumption for the back light to be reduced therefore extending the lifetime of battery powered liquid crystal devices that are common for note book computers. The surface lenslet structure polymer layer of the invention and reflective layer can be easily changed to achieve the desired diffusion and reflectivity requirements for many liquid crystal devices thus allowing the invention materials to be responsive to the rapidly changing product requirements in the liquid crystal display market.

Complex lens diffuse reflectors provide better diffuse reflection than a simple reflective lens or voided structure because the surface has more curved surfaces for light to pass through. When light passes through complex lenses, the angles at which the light is deflected vary over a wider range depending on where the light passes through on the surface of the complex lens. Both curved concave and convex polymer complex lenses have been shown to provide very efficient diffusion of light.

The elastic modulus and scratch resistance of the reflector is improved over prior art cast coated polymer reflectors rendering a more robust reflector during the assembly operation of the liquid crystal device. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "reflector" means any material that is able to reflect light. The term "diffuse reflector" means any material that is able to reflect and diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse reflected light" means the percent diffusely reflected light at 500 nm as compared to the total amount of light at 500 nm of the light source. The term "diffuse light transmission efficiency" means the ratio of the percent diffuse transmitted light at 500 nm to % total transmitted light at 500 nm multiplied by a factor of 100. The term "diffuse reflected light efficiency" means the ratio of the percent diffuse reflected light at 500 nm to the percent total reflected light at 500 nm multiplied by a factor of 100. The term "polymeric film" means a film comprising polymers. The term "polymer" means homo- and co-polymers. The term "average", with respect to lens size and frequency, arithmetic mean over the entire film surface area.

"Transparent" means a film with total light transmission of 50% or greater at 500 nm. "In any direction", with respect to lenslet arrangement on a film, means any direction in the x and y plane. The term "pattern" means any predetermined arrangement of lenses whether regular or random.

Better control and management of the back light are driving technological advances for liquid crystal displays (LCD). LCD screens and other electronic soft display media are back lit primarily with specular (highly directional) fluorescent tubes. Back reflection films are used to distribute the light evenly across the entire display area and change the light from specular to diffuse.

Diffusion is achieved by light scattering as it passes though materials with varying indexes of refraction. This scattering produces a diffusing medium for light energy. There is an inverse relationship between reflection of light and diffusion and the optimum combination of these two parameters must be found for each application.

The diffuse reflector of the present invention can be produced by using a conventional film-manufacturing facility in high productivity.

The diffuse reflector has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets in which the minor lenses are formed randomly on top of. "Minor lenses" mean lenses smaller than the major lenses that are formed on the major lens. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the inner surface of a sphere with the surface feature into the surface of the film. The term "convex" means curved as the exterior of a sphere with the surface feature out of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention. These factors create the diffuse nature of the diffuse reflector.

The divergence of light through the lens may be termed "asymmetric", which means that the divergence in the horizontal direction is different from the divergence in the vertical direction. The divergence curve is asymmetric, or that the direction of the peak light transmission is not along the direction θ=0°, but is in a direction non-normal to the surface. There are least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a reflector having lenses whose optical axes are off-set from the center of the respective lenses results in dispersing light from the film in an asymmetric manner. The lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

A diffuse reflector comprising a reflective layer and a polymeric film comprising a plurality of convex or concave complex lenses on the surface thereof is preferred. Curved concave and convex polymer lenses have been shown to provide very efficient diffusion of light. Combined with a reflective surface, this proves a very efficient diffuse reflector. The more light that is diffusely reflected, not spectrally reflected, or transmitted or absorbed, leads to a brighter back lit display. The diffuse reflector has excellent diffusion characteristics while maintaining high reflectivity.

The diffuse reflector wherein the polymeric film comprises two or more layers comprising a plurality of convex or concave complex lenses is preferred because the amount of diffusion increases as light passes through each layer of polymeric film. This diffusion occurs because of the shape of the lenses on the surface of each layer and the index of refraction mismatch between the layers. By providing multiple layered lenses, index of refraction changes between layers can be achieved, improving the diffusion efficiency of the multiple layered complex lenses compared to a complex lens comprising one layer. The increase in diffusion efficiency is proportional to the index of refraction changes and can range from a 3% improvement to a 23% improvement in diffusion efficiency in the diffuse reflector. The complex lenses of the invention, used to diffuse light, are formed with several layers of polymers. By forming the lenses with more than one layer, each layer a have separate functionality compared to a mono-layered complex lenses. The multiple layered complex lenses can be improved over a mono-layered lens by providing a hard polymer on the surface improving scratch resistance, changing the index of refraction of the layers allows for more efficient diffusion of transmitted light and bonding layers to bond the complex lenses to the base materials of the invention. Further, the multiple layered lens can contain addenda to improve the functionality of the light diffuser.

The polymeric film is preferably transparent because the polymeric film does not absorb light to limit reflectivity. The transparent polymeric film can add stability and strength to the reflector without changing the reflectivity or the diffuse reflectivity of the reflector. More preferably the transparent polymeric film has a transmission percent of 90% at 500 nm. It has been shown that a polymeric film with over 90% transmission at 500 nm does not decrease reflectivity.

One embodiment, the diffuse reflector having the reflective layer adhesively adhered to the bottom of the polymeric film, is preferred because the light is diffused twice as the reflector reflects it, as the light travels from the air through the polymeric complex lenses and after the light has been reflected as it exits the polymeric film through the complex lenses to the air. This embodiment is also well suited for manufacture in a photographic manufacturing system.

In another embodiment, the reflective layer is integral to the bottom of the polymeric film. This is preferred because the light is diffused twice as the reflector reflects it, as the light travels from the air through the polymeric complex lenses and after the light has been reflected as it exits the polymeric film through the complex lenses to the air. Because the reflection layer is integral to the polymeric base, it eliminates as adhesion step and the reflective layer can be in better optical contact with the polymer film.

Another embodiment where the reflective layer is integral to the top surface of the complex lenses is preferred. The reflection occurs at the surface of the complex lens film and is diffused by the reflective lenses on the surface. This is advantaged because the light is reflected off of the surface of the lenses instead of having to pass through multiple polymeric layers, making more efficient reflectivity. Another advantage is that the amount of reflectivity and diffusive reflectivity can be controlled by the thickness of the reflective layer on the surface of the complex lenses.

In another embodiment, the polymeric film is reflective. This is preferred because the lenses can be applied directly onto the reflective base thus eliminating the need for a separate polymeric film and a reflective film. Changing the geometry of the lenses applied to the reflective base can easily alter the amount of diffusion for the reflection.

In another embodiment, the convex or concave lenses are reflective. The reflection occurs at the surface of the complex lens film and is diffused by the reflective lenses on the surface. This is advantaged because the light is reflected off of the surface of the lenses instead of having to pass through multiple polymeric layers, making reflectivity more efficient. Another advantage is that the amount of reflectivity and diffusive reflectivity can be controlled by the geometry of the lenses and the thickness of the of the complex lenses layer.

Preferably, the reflective layer comprises metal. Metals, such as gold or silver, have very efficient reflectivity that when used in the reflector, increases the efficiency of the reflector. Metal also adds strength, hardness, and electrical conductivity properties to the reflection film.

In another embodiment, the reflective layer comprises an alloy. Using an alloy is preferred because the reflectance and mechanical properties can be tailored by using two or more metals with different properties.

In another embodiment, the reflective layer comprises an oxide, such as titanium dioxide. Oxides are preferred because they have high reflectivity and scattering properties. The scattering properties of increase the diffusion efficiency of the diffuse reflector film.

In another embodiment, the reflective layer comprises layer of polymer with differing indexes of refraction. The differing index of refraction between the layers creates a reflective film. This film could have tunable coloration, depending on the thicknesses of the layers and indexes of refraction and could add color to a display. More preferred is the reflective layer comprising more than 30 layers of polymer with differing indexes of refraction of 0.03 to 0.15. It has been shown that this number of layers and range of index of refraction optimizes the reflective nature of the film.

Preferably, the reflective layer has a thickness of 0.5 nanometers to 50 micrometers. A layer with thickness less than 0.5 nanometers is difficult to manufacture and thus cost prohibitive. A reflective layer thickness of over 50 micrometers does not give added reflectivity but does add cost because more material is required in the film. It has been shown that this range can deliver the desired reflectivity properties while minimizing material and manufacturing costs. Preferably, the diffuse reflector has a reflective layer with thickness of 0.5 to 50 nanometers. At this range the diffuse reflector becomes a diffuse transflector. The metallized coating is thin enough to reflect part of the incoming light and allow part of the light to be transmitted. This diffuse transflector can be used in a transflection device, such as a cell phone or PDA display. Preferably, the reflective layer has a percent reflectivity of 75% or greater at 500 nm. At a reflectivity of less than 68%, the amount of light lost by the reflective layer (due to transmission or absorption) causes a display, such as a transmission, transflective, or reflective liquid crystal display, to become dark and difficult to see. Most preferred is a reflective layer with reflectivity of 96 percent or greater at 500 nm because the high reflectivity creates a bright display. This high reflectivity can either make a transmission-type display brighter or be used to extend battery life. It can make a reflective-type display brighter and easier to read in all lighting situations.

Preferably, the reflective layer has a resistivity of 0.03 to 1800 ohms per square. This range has been shown to be optimal for electrostatic printing. If the reflective layer had a resistively of 2000 ohms per square or greater and a charge was placed on the layer, the layer would heat because of inefficient electricity transfer.

The concave or complex lenses on the surface of the polymer film are preferably randomly placed. Random placement of lenses increases the diffusion efficiency of the invention materials. Further, by avoiding a concave or convex placement of lenses that ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. The placement of concave lenses on the polymer film creates a surface that can be in optical contact with the adjacent films and still effectively diffuse the light. The placement of convex lenses on polymer film creates stand off from other adjacent films providing the necessary air gap required for efficient diffusion by the lenses.

Preferably, the concave or convex lenses have an average frequency in any direction of between 5 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are most preferred. It has been shown that an average frequency of between 22 and 66 complex lenses provide efficient light diffusion and can be efficiently manufactured utilizing cast coated polymer against a randomly patterned roll.

The preferred transparent polymeric film has concave or convex lenses at an average width between 3 and 60 micrometers in the x and y direction. When lenses have sizes below 1 micrometer the lenses impart a color shift in the light passing through because the lenses dimensions are on the order of the wavelength of light. When the lenses have an average width in the x or y direction of more than 68 micrometers, the lenses is too large to diffuse the light efficiently. More preferred, the concave or convex lenses at an average width between 15 and 40 micrometers in the x and y direction. This size lenses has been shown to create the most efficient diffusion.

The concave or convex complex lenses comprising minor lenses wherein the diameter of the smaller lenses is preferably less than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 micrometers. When minor lenses have sizes below 1 micrometer the lenses impart a color shift in the light passing through because the lenses dimensions are on the order of the wavelength of light. When the minor lenses have sizes above 25 micrometers, the diffusion efficiency is decreased because the complexity of the lenses is reduced. Most preferred are the minor lenses having a width in the x and y direction between 3 and 8 micrometers. This range has been shown to create the most efficient diffusion as thus the most efficient diffuse reflectance.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light reflectivity and diffusion. High light transmission provides for a brighter LC device than diffusion materials that have low light transmission values because more of the light is reflected and not lost due to absorption.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the transparent polymeric film wherein the polymeric film comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of reflector sheets for insertion into display devices.

In another embodiment of the invention, the transparent polymeric film wherein the polymeric film comprises a carbonate repeating unit. Polycarbonates have high optical transmission values compared to polyolefin polymers and therefore can improve the brightness of display devices by increasing the diffuse reflectance efficiency.

In another embodiment of the invention, the transparent polymeric film wherein the polymeric film comprises an olefin repeating unit. Polyolefins are low in cost and have good strength and surface properties.

In another embodiment of the invention, the transparent polymeric film wherein the polymeric film comprises a tri acetyl cellulose. Tri acetyl cellulose has both high optical transmission and low optical birefringence allowing the reflector of the invention to have efficient diffuse reflectance and reduce unwanted optical patterns.

Preferably, the concave or convex lenses are semi-spherical meaning that the surface of each lenslet is a sector of a sphere, but not necessarily a hemisphere. This provides excellent even diffusion for diffuse reflection over the x y plane. The semi-spherical shaped lenses scatter the incident light uniformly, ideal for a backlit or reflective display application where the display area need to be lit uniformly.

In another embodiment of the invention, the concave or convex lenses are aspherical meaning that width of the lenses differ in the x and y direction. This scatters light selectively over the x y plane. For example, a particular x y aspect ratio might produce an elliptical scattering pattern. This would be useful in a backlit or reflective LC display, spreading the light more in the horizontal direction than the vertical direction for increased viewing angle.

The convex or concave lenses preferably have a height/diameter ratio of between 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of between 0.25 to 0.48. It has been proven that the most efficient diffusion occurs in this range.

The number of minor lenses per major lens is preferably between 2 and 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred is 5 to 18 minor lenses per major lens. This range has been shown to produce the most efficient diffusion.

The thickness of the reflector preferably is less than 300 micrometers or more preferably 60 to 150 micrometers. Current design trends for LC devices are toward lighter and thinner devices. By reducing the thickness of the reflector to less than 300 micrometers, the LC devices can be made lighter and thinner. The more preferred thickness of the reflector is 60 to 150 micrometers which further allows the reflector to be conveniently combined with a other optical materials in an LC device such as the wave guide and reflection tape. Further, by reducing the thickness of the reflector, the materials content of the reflector is reduced.

Since the reflector film of the invention typically is used in combination with other optical web materials, a reflector with an elastic modulus greater than 500 MPa is preferred. An elastic modulus greater than 500 MPa allows for the reflector to be laminated with a pressure sensitive adhesive for combination with other optical webs materials. Further, because the reflection film is mechanically tough, the reflection film is better able to with stand the rigors of the assembly process compared to prior art cast reflection films which are delicate and difficult to assemble.

Figure 1:
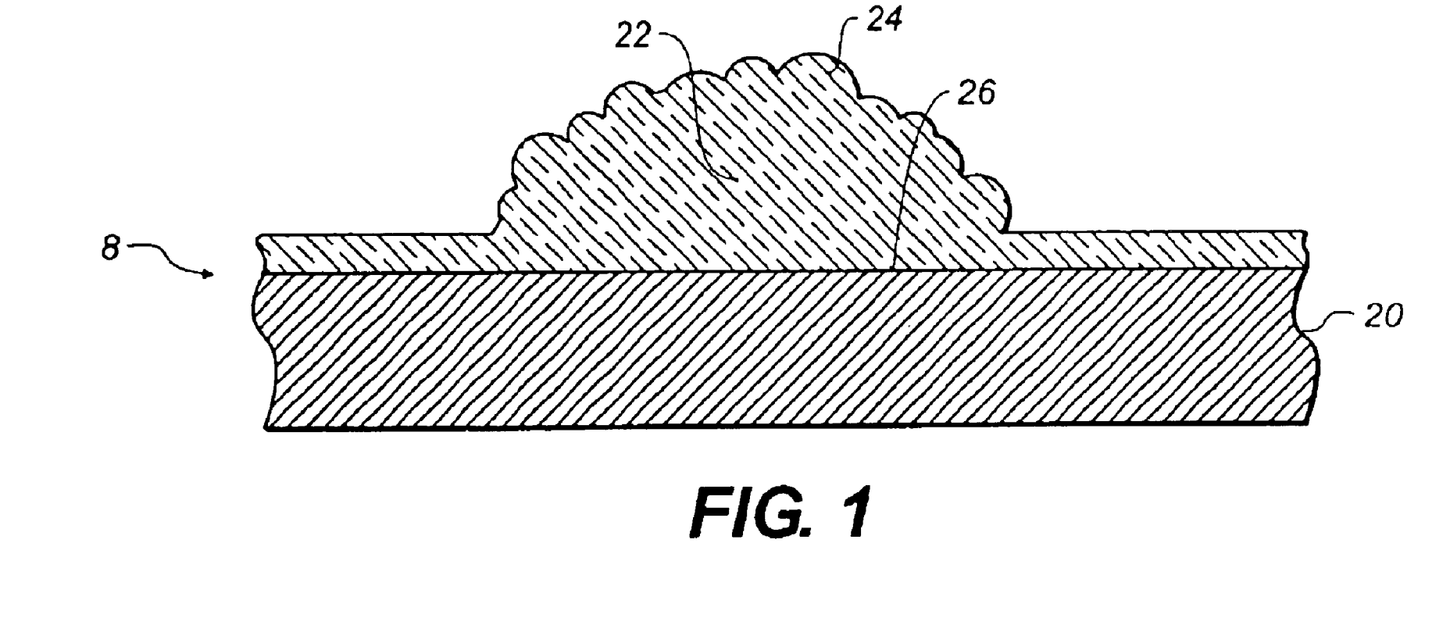
FIG. 1 illustrates a cross section of a complex lens formed on a reflective base material.

FIG. 1 illustrates one embodiment of the current invention. FIG. 1 shows a cross section of a complex lens formed on a reflective base material suitable for use in a liquid crystal display device. Reflection film 8 comprises reflective base 20, on which is located major lens 22 on the surface of reflective base 26. Minor lenses 24 are on the surface of the major lens 22. The invention comprises a plurality of minor lenses 24 on the surface of the major lens 22. The reflector of the invention contains many diffusion surfaces from both the major lens 22 and the minor lenses 24.

Figure 2:
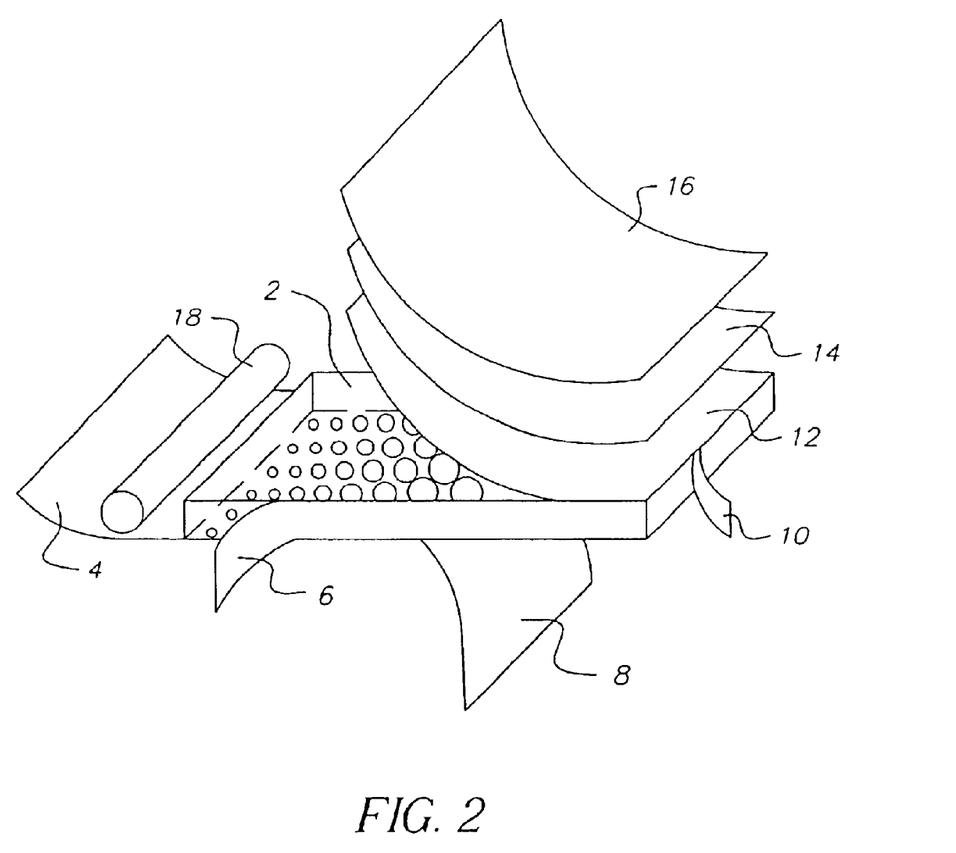
FIG. 2 illustrates a liquid crystal display device with a reflector.

FIG. 2 illustrates a liquid crystal display device with a light diffuser. Visible light source 18 is illuminated and light is guided into light guide 2. Lamp reflector 4 is used to direct light energy into the light guide 2, represented by an acrylic box. Reflection tape 6, reflection tape 10 and reflection film 8 are utilized to keep light energy from exiting the light guide 2 in an unwanted direction. Light diffusion film 12 in the form of a transparent polymeric film is utilized to diffuse light energy exiting the light guide in a direction perpendicular to the light diffuser. Brightness enhancement film 14 is utilized to focus the light energy into polarization film 16. The light diffusion film 12 is in contact with brightness enhancement film 14.

Figure 3:
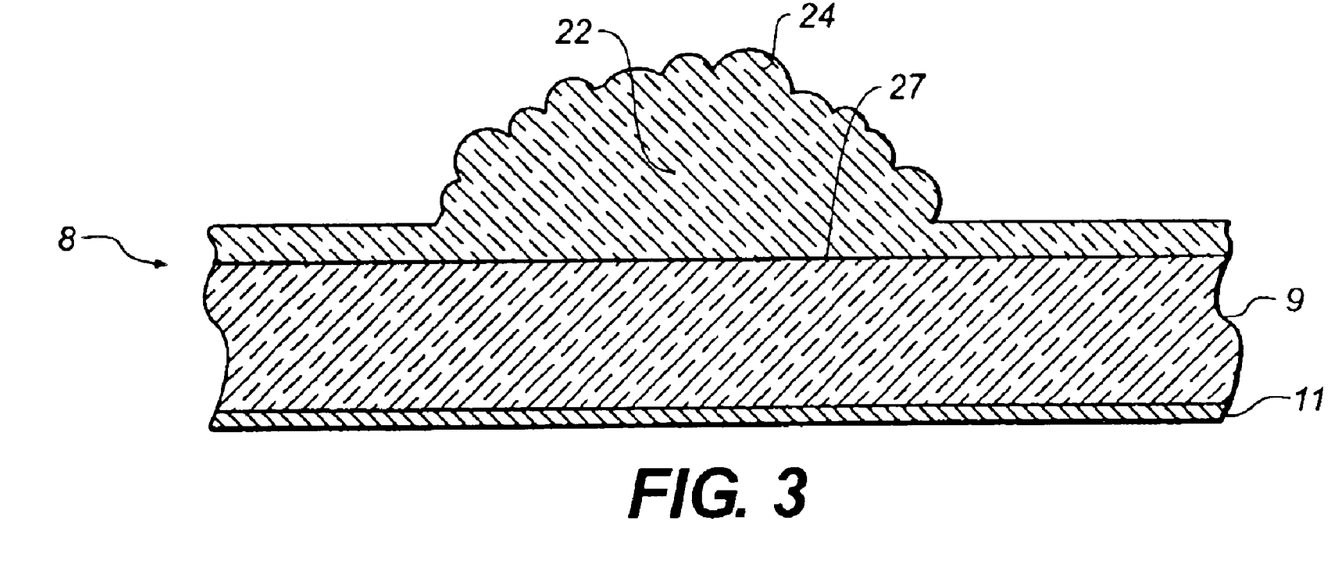
FIG. 3 illustrates a cross section of a complex lens formed on a reflective base material comprising a transparent layer and a reflective layer.

FIG. 3 illustrates another embodiment of the current invention. FIG. 3 shows a cross section of a complex lens formed on a transparent polymeric base with a reflective layer suitable for use in a liquid crystal display device. Reflection film 8 comprises transparent polymeric base 9, on which is located major lens 22 on the surface of transparent polymer film 27 and reflective layer 11 on the transparent polymeric base 9 side opposite to the complex lenses. Minor lenses 24 are on the surface of the major lens 22. The invention comprises a plurality of minor lenses 24 on the surface of the major lens 22. The reflector of the invention contains many diffusion surfaces from both the major lens 22 and the minor lenses 24. Polymer sheet for the transparent polymeric film comprising a plurality of convex and/or concave complex lenses on a surface thereof are generally dimensionally stable, optically clear and contain a smooth surface. Biaxially oriented polymer sheets are preferred as they are thin and are higher in elastic modulus compared to cast coated polymer sheets. Biaxially oriented sheets are conveniently manufactured by coextrusion of the sheet, which may contain several layers, followed by biaxial orientation. Such biaxially oriented sheets are disclosed in, for example, U.S. Pat. No. 4,764,425.

Suitable classes of thermoplastic polymers for the transparent polymeric film include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Polyolefins particularly polypropylene, polyethylene, polymethylpentene, and mixtures thereof are preferred. Polyolefin copolymers, including copolymers of propylene and ethylene such as hexene, butene and octene are also preferred. Polypropylenes are most preferred because they are low in cost and have good strength and surface properties.

Preferred polyesters for the transparent polymeric film of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexandimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides for the transparent polymeric film include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fimaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda can be added to the reflective film to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1–4-Bis (O-Cyanostyryl) Benzol and 2-Amino-4-Methyl Phenol.

The reflection films may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The diffuse reflection sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The lenslet diffuse reflector film may also be used in conjunction with a light diffuser, for example a bulk diffuser, a lenticular layer, a beaded layer, a surface diffuser, a holographic diffuser, a micro-structured diffuser, another lens array, or various combinations thereof. The lenslet diffuse reflection film disperses, or diffuses, the light, thus destroying any diffraction pattern that may arise from the addition of an ordered periodic lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels.

The reflection film of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin, metal oxide, or a filler.

The complex lens diffuse reflector film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n * d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.*d$ since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffuse reflection film assembly was developed. The preferred approach comprises the steps of providing a positive master chill roll having a plurality of complex lenses. The diffuse reflection film is replicated from the master chill roller by casting a molten polymeric material to the face of the chill roll and transferring the polymeric material with lenslet structures onto a transparent polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, a LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The diffuse reflecting film of the present invention can even out the luminance when the film is used as a back reflecting film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The back reflector film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the reflective film of the present invention is necessary to be positioned behind the backlight. The reflective film can also be used in a reflective type display. Light enters the display from the environment and is reflected by the reflection film and illuminates the liquid crystal. The reflective film can also be used in a transflective display where the display operates in both reflection and transmission states. Examples of this are cell phones and PDA's where most times the back light is off and the display operates in reflection mode, but it also has a back light to work in transmission mode. The reflection film of the present invention can even the lightness of a liquid crystal display device across the display because the film has excellent light-scattering properties to expand the light to give excellent visibility in all directions. The present invention has a significant use as a light source destructuring device.

The diffuse reflector of the present invention, though focused on backlit displays, can be used in any situation where light needs to be diffusely reflected. The diffuse reflector of the present invention could be used as a diffuse mirror for bounce lighting for photography.

The complex lens diffuse reflection film could also be used for screens for front projection display. The reflector maximizes light available for bright, high-gain viewing. It provides excellent viewing under high ambient light conditions and utilize precise dispersion angles that allow for the maximum utilization of available light.

The reflection film can be used as a retroreflective member for a traffic sign. It can be used in a state applied to a car, a bicycle, person, etc.

The reflector of the present invention also has significant architectural uses such as providing appropriate light for work and living spaces. The complex lens reflector provides a more uniform light output when reflected so that light is diffused to all angles across the room evenly and with no hot spots.

Further, the reflector of the present invention can be used widely as a part for an optical equipment such as a displaying device. For example, it can be used in a reflective liquid crystal display device or a front scattering film directing the film to the front-side (observer's side) in the case of placing the metallic film to the back side of the device (opposite to the observer). The lenslet reflector film of the present invention can be used as an electrode by laminating a transparent conductive layer composed of indium oxide represented by ITO film.

Another application for the reflector film is a front projection screen, where it is generally desired to project the image from a light source onto a screen over a large area. The viewing angle for a television is typically smaller in the vertical direction than in the horizontal direction. The diffuser acts to spread the light to increase viewing angle.

Other applications for the diffuse reflector are graphic displays, packaging, and labels.

Reflection film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. Diffuse transmittance is defined as the percent of light passing though the sample excluding a 2.5 degree angle from the incident light angle. The diffuse reflectance spectra were measured by placing the samples at the sample port with the complex lens side towards the integrating sphere. In order to exclude reflection from a sample backing, nothing was placed behind the sample. Diffuse reflectance is defined as the percent of light refelcted by the sample excluding a 2.5 degree angle from the incident light angle. The total reflectance spectra were measured by placing the samples at the sample port with the coated side towards the integrating sphere and the incoming light at an angle. In order to exclude reflection from a sample backing, nothing was placed behind the sample. All spectra were acquired between 350 and 800 nm. As the reflectance and transmittance results are quoted with respect to the 99% tile, the values are not absolute, but would need to be corrected by the calibration report of the 99% tile. Total transmission and total reflection, when added, may not add up to 100% due to absorbencies of the sample or slight variations in the sample measured.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample and reflected more than 2.5 degrees. Percentage total reflected light refers to percent of light that is reflected through the sample and reflected at all angles. The percentages quoted in the examples were measured at 500 nm.

Embodiments of the invention may provide not only improved diffuse light reflection but also a diffuse reflector of reduced thickness, and that has excellent light scattering tendencies.

The entire contents of the patents and other publications referred to in this specification are incorporated herein by reference.

EXAMPLES

In this example, complex lens diffuse reflector of the invention was created by extrusion casting an extrusion grade polyolefin polymer against a pattered chill roll containing the complex lens geometry. The patterned polyolefin polymer, in the form the complex lens was then transferred to a polyester web material with a metal deposition coating thereby forming a diffuse reflector with complex surface lenses. This example will show that complex surface lenses formed on a transparent polymer web material with a metallic coating provide exceptional light diffusion compared to random single polymer lenses formed on the surface of a polymer web with a metallic coating and a prior art diffuse reflector utilizing a voided web material. Further, it will be obvious that the diffuse reflector will be low in cost and have mechanical properties that allow for insertion into LC devices.

Two patterned chill rolls (complex lens and a single lens geometry) were manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex. The single lens patterned roll (control) was manufactured by starting with a copper roll blank and grit blasted with size 14 spherical grit at a pressure of 310 MPa. The resulting single lenses on the surface of the roll were concave.

The two patterned chill rolls were utilized to create diffuse reflection sheets by extrusion coating a polyolefin polymer from a coat hanger slot die comprising substantially 96.5% LDPE (Eastman Chemical grade D4002P), 3% Zinc Oxide and 0.5% of calcium stearate. The polymer was cast onto a 100 micrometer transparent oriented web polyester web with a 0.1 micrometer layer of aluminum vacuum metallized on the side of the web opposite the complex lenses. The polyolefin cast coating coverage was 25.88 g/m$^2$.

Vacuum metallizing uses high purity aluminum wire fed into a crucible to produce a metallic vapor stream. The vapor is condensed onto a polymeric substrate. Sputter coating could have also been used and could have deposited other materials besides aluminum, such as copper, silver, or stainless steel.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers. The structure of the cast coated diffuse reflector sheets is as follows,

| |
|---|
| Formed polyolefin lenses |
| Transparent polyester base |
| Silver metal |

The two diffuse reflecting sheets containing formed polymer lenses from above (invention and control) and a prior voided polymer diffuse reflector were measured for percent diffuse reflectance, percent total reflectance, and percent total light transmission, all at 500 nm.

Reflection film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. The total reflectance spectra were measured by placing the samples at the sample port with the coated side towards the integrating sphere and the incoming light at an angle. In order to exclude reflection from a sample backing, nothing was placed behind the sample. All spectra were acquired between 350 and 800 nm. As the reflectance results are quoted with respect to the 99% tile, the values are not absolute, but would need to be corrected by the calibration report of the 99% tile. Total transmission and total reflection, when added, may not add up to 100% due to absorbencies of the sample or slight variations in the sample measured.

Percentage total transmitted light refers to percent of light that is transmitted though the sample at all angles. Diffuse transmittance is defined as the percent of light passing though the sample excluding a 2.5 degree angle from the incident light angle compared to the amount of light from the light source. The diffuse light transmission is the percent of light that is passed through the sample by diffuse transmittance. Diffuse reflectance is defined as the percent of light reflected by the sample and reflected more than 2.5 degrees. Percentage total reflected light refers to percent of light that is reflected through the sample and reflected at all angles. The percentages quoted in the examples were measured at 500 nm.

The measured values for the invention, control and prior art materials are listed in Table 1 below.

TABLE 1

| | Sample | | |
|---|---|---|---|
| | 1 Invention (Complex Lens) | 2 Control (Single Lens) | 3 Control (Prior Art) |
| Diffuse reflectance measured at 500 nm | 96.8 | 87.4 | 92.6 |
| Total Reflectance measured at 500 nm | 97.5 | 97.3 | 93.6 |
| Total transmission measured at 500 nm | 2.1 | 1.7 | 5.5 |

As the data above clearly indicates, complex lens diffuse reflector provides excellent percent total reflection and percent diffuse reflection allowing for brighter liquid crystal display devices. The diffuse light reflection of 96.8% for the invention materials is significantly better than both the single lens (87.4%) and the prior art materials (93.6%). The complex lens of the invention provides significantly more curved surface area for diffuse reflected light compared to a single lens (one curved surface) and the prior art materials (voided structure). Diffuse light reflection is an important factor in the quality of a LC device in that the reflection sheet must diffuse the spectular light from the backlight and spread it evenly across the display. The complex lenses also provided more diffuse light reflectivity than samples 2 and 3.

Integrating all of the measurements in Table 1, sample one combined the highest high total reflectance with high diffusely reflected light. This created a film that spread the light evenly across the display while reflecting almost all the light to enable a brighter LC display. Sample two had a high reflectance value creating a bright LC display, but low diffuse reflectance value so the light would not be as even across the display. Most consumers would find this variation of brightness across their display objectionable. In sample three, most of the light reflected by the film was diffused enabling an evenly illuminated display. Though the light reflected was almost all diffused, the total reflection measurement was low with a significant percent of the light being lost due to transmission or absorption (6.4%) and thus creating an unacceptably dark display.

Further, because the invention materials were constructed on an oriented polyester base, the materials have a higher elastic modulus compared to cast sheets. The oriented polymer base of the example allows for the diffuse reflector to be thin and therefore cost efficient and light as the materials content of the example materials is reduced compared to prior art materials.

While this example was directed primarily toward the use of diffuse reflectors in LC devices, the materials of the invention have value in other reflection applications such as backlight display, diffusely reflecting specular home lighting, a diffuse lighting device and a projection screen.

| Parts List | |
|---|---|
| 2. | Light guide |
| 4. | Lamp Reflector |
| 6. | Reflection tape |
| 8. | Reflection film |
| 9. | Transparent polymeric base |
| 10. | Reflection tape |
| 11. | Reflective layer |
| 12. | Light diffusion film |
| 14. | Brightness enhancement film |
| 16. | Polarization film |
| 18. | Visible light source |
| 20. | Reflective Base |
| 22. | Major lens |
| 24. | Minor lens |
| 26. | Surface of reflective base |
| 27. | Surface of transparent polymeric base |

What is claimed is:

1. A diffuse reflector comprising a reflective layer and a transparent polymeric film comprising a plurality of complex lenses on a surface thereof, the reflector having a thickness less than 300 micrometers.

2. The diffuse reflector of claim 1 wherein the film comprises two or more layers each comprising a plurality of complex lenses on a surface thereof.

3. The diffuse reflector of claim 1 wherein the film has a transmission greater than 90%.

4. The diffuse reflector of claim 1 wherein the reflective layer is adhesively bonded to the bottom surface of the film.

5. The diffuse reflector of claim 1 wherein the reflective layer is integral to the bottom surface of the film.

6. The diffuse reflector of claim 1 wherein the reflective layer is integral to complex lenses on the top surface of the film.

7. The diffuse reflector of claim 1 wherein the film is reflective.

8. The diffuse reflector of claim 1 wherein the complex lenses are reflective.

9. The diffuse reflector of claim 1 wherein the reflective layer comprises a metal.

10. The diffuse reflector of claim 1 wherein the reflective layer comprises an alloy.

11. The diffuse reflector of claim 1 wherein the reflective layer comprises an oxide.

12. The diffuse reflector of claim 1 wherein the reflective layer comprises layers of polymer with differing indexes of refraction.

13. The diffuse reflector of claim 1 wherein the reflective layer comprises greater than 30 layers of polymer with differing indexes of refraction of 0.03 to 0.15 between at least two adjacent layers.

14. The diffuse reflector of claim 1 wherein the reflective layer thickness is 0.5 to 500 nanometers.

15. The diffuse reflector of claim 1 wherein the reflective layer thickness is 0.5 to 50 nanometers.

16. The diffuse reflector of claim 1 wherein the reflective layer thickness is from 0.25 to 50.0 micrometers.

17. The diffuse reflector of claim 1 wherein the reflective layer has a reflectivity at 500 nanometers of greater than 75%.

18. The diffuse reflector of claim 1 wherein the reflective layer has a reflectivity at 500 nanometers of greater than 96%.

19. The diffuse reflector of claim 1 wherein the reflective layer has a resistivity of 0.03 to 1800 ohms per square.

20. The diffuse reflector of claim 1 wherein the complex lenses are randomly distributed on the surface of the film.

21. The diffuse reflector of claim 1 wherein the lenses are present on both the top and bottom surfaces of the film.

22. The diffuse reflector of claim 1 wherein the complex lenses have an average frequency in any direction of 5 to 250 complex lenses/mm.

23. The diffuse reflector of claim 22 wherein the complex lenses have an average frequency in any direction of 22 to 66 complex lenses/mm.

24. The diffuse reflector of claim 1 wherein the complex lenses have an average width in the x and y direction of 3 to 60 micrometers.

25. The diffuse reflector of claim 24 wherein the complex lenses have an average width in the x and y direction of 15 to 40 micrometers.

26. The diffuse reflector of claim 1 wherein the complex lenses comprise major and minor lenses wherein the diameter of the smaller lenses is on average less than 80% of the diameter of the major lenses.

27. The diffuse reflector of claim 1 wherein the complex lenses comprise a multiple of minor lenses wherein the minor lenses have an average width in the x and y direction of 2 to 20 micrometers.

28. The diffuse reflector of claim 1 wherein the complex lenses comprise a multiple of minor lenses wherein the minor lenses have an average width in the x and y direction of 3 to 8 micrometers.

29. The diffuse reflector of claim 1 wherein the complex lenses comprise a material containing an olefin repeating unit.

30. The diffuse reflector film of claim 1 wherein the complex lenses comprise a material containing a carbonate repeating unit.

31. The diffuse reflector of claim 1 wherein the complex lenses comprise a material containing an ester repeating unit.

32. The diffuse reflector of claim 1 wherein the transparent film comprises a material containing an ester repeating unit.

33. The diffuse reflector of claim 1 wherein the transparent film comprises a material containing a carbonate repeating unit.

34. The diffuse reflector of claim 1 wherein the transparent film comprises a material containing an olefin repeating unit.

35. The diffuse reflector of claim 1 wherein the transparent film comprises a material containing triacetyl cellulose.

36. The diffuse reflector of claim 1 wherein the complex lenses are semi-spherical.

37. The diffuse reflector of claim 1 wherein the complex lenses are aspherical.

38. The diffuse reflector of claim 1 wherein the complex lenses have an average height/diameter ratio of 0.03 to 1.0.

39. The diffuse reflector of claim 1 wherein the complex lenses have an average height/diameter ratio of 0.25 to 0.48.

40. The diffuse reflector of claim 26 wherein the number of minor lenses per major lens is 2 to 60.

41. The diffuse reflector of claim 40 wherein the number of minor lenses per major lens is 5 to 18.

42. The diffuse reflector of claim 1 having a thickness of 60 to 150 micrometers.

43. A diffuse light comprising a light source and a diffuse reflector of claim 1.

44. A back lighted imaging media comprising a light source and a diffuse reflector comprising a reflective layer and a polymeric film comprising a plurality of convex and/or concave complex lenses on a surface thereof.

45. A liquid crystal device comprising a light source and a diffuse reflector of claim 1 wherein the film is located between the light source and the reflective layer.

46. A liquid crystal device component comprising a light source and a diffuse reflector of claim 1.

47. A diffuse reflector comprising a reflective layer and a transparent polymeric film comprising a plurality of complex lenses on a surface thereof, wherein the reflective layer has a reflectivity at 500 nanometers of neater than 75%.

48. A diffuse reflector comprising a reflective layer and a transparent polymeric film comprising a plurality of complex lenses on a surface thereof, wherein the complex lenses have an average frequency in any direction of 5 to 250 complex lenses/mm.

49. A diffuse reflector comprising a reflective layer and a transparent polymeric film comprising a plurality of complex lenses on a surface thereof, wherein the complex lenses are randomly distributed on the surface of the film.

* * * * *